(12) United States Patent
Bergam et al.

(10) Patent No.: US 11,624,836 B2
(45) Date of Patent: Apr. 11, 2023

(54) DETECTION OF DAMAGE TO OPTICAL ELEMENT OF ILLUMINATION SYSTEM

(71) Applicant: Continental Automotive Systems, Inc., Auburn Hills, MI (US)

(72) Inventors: Jacob A Bergam, Santa Barbara, MI (US); Cleveland Eugene Rayford, II, Camarillo, CA (US); Luis Alfredo Villalobos-Martinez, Camarillo, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 836 days.

(21) Appl. No.: 16/580,002

(22) Filed: Sep. 24, 2019

(65) Prior Publication Data

US 2021/0088670 A1 Mar. 25, 2021

(51) Int. Cl.
*G01N 21/88* (2006.01)
*G01S 17/931* (2020.01)
(Continued)

(52) U.S. Cl.
CPC .......... *G01S 17/931* (2020.01); *G01S 7/4813* (2013.01); *G01S 7/497* (2013.01); *G01S 17/42* (2013.01); *G01S 17/88* (2013.01); *G01S 17/894* (2020.01); *G02F 1/0063* (2013.01); *G02F 1/292* (2013.01); *G01S 17/10* (2013.01); *G01S 17/89* (2013.01); *G01S 2007/4975* (2013.01)

(58) Field of Classification Search
CPC ................... G01S 7/497; G01S 7/4813; G01S 2007/4975; G01S 17/936; G01S 17/89; G01N 21/958; G01N 21/552; G01N 21/88; G01N 21/94; G01N 21/4738; G01N 21/9505; G01N 21/892; G01N 21/896; G01N 11/00; G01N 2021/8965; B23K 26/07; G02F 1/292; G02F 1/0063
USPC ............ 356/239.8, 239.1, 239.4, 239.2, 124, 356/239.7, 237.1–237.6; 250/559.45, 250/559.01, 559.42
See application file for complete search history.

(56) References Cited

U.S. PATENT DOCUMENTS 4,711,512 A 12/1987 Upatnieks
5,413,884 A 5/1995 Koch et al.
(Continued)

FOREIGN PATENT DOCUMENTS

CN 108344378 A 7/2018
CN 108388063 A 8/2018
(Continued)

OTHER PUBLICATIONS

International Search Report and the Written Opinion of the International Searching Authority dated Jan. 19, 2021 for the counterpart PCT Application No. PCT/US2020/51903.
(Continued)

*Primary Examiner* — Hoa Q Pham

(57) ABSTRACT

An assembly includes an optical element having a light-shaping region. A light emitter is aimed into the optical element along an internal reflective path. The internal reflective path extends across the light-shaping region. A photodetector is positioned along the internal reflective path. Integrity of the optical element is determined based on detection of light from the light emitter along the internal reflective path by the photodetector.

21 Claims, 12 Drawing Sheets

(51) Int. Cl.
*G02F 1/29* (2006.01)
*G02F 1/00* (2006.01)
*G01S 7/481* (2006.01)
*G01S 7/497* (2006.01)
*G01S 17/42* (2006.01)
*G01S 17/894* (2020.01)
*G01S 17/88* (2006.01)
*G01S 17/10* (2020.01)
*G01S 17/89* (2020.01)

(56) References Cited

U.S. PATENT DOCUMENTS

| | | | |
|---|---|---|---|
| 5,627,638 A * | 5/1997 | Vokhmin | G01M 11/0278 356/124 |
| 6,226,080 B1 * | 5/2001 | Takeuchi | G01N 21/958 356/239.8 |
| 7,511,807 B2 * | 3/2009 | Fang | G01N 21/958 356/239.8 |
| 8,492,696 B2 | 7/2013 | Akerman et al. | |
| 8,592,739 B2 | 11/2013 | McEldowney et al. | |
| 8,804,101 B2 | 8/2014 | Bailey et al. | |
| 9,069,080 B2 | 6/2015 | Stettner et al. | |
| 9,110,169 B2 | 8/2015 | Stettner et al. | |
| 9,229,109 B2 | 1/2016 | Stettner et al. | |
| 9,277,204 B2 | 3/2016 | Gilliland et al. | |
| 9,420,246 B2 | 8/2016 | Na et al. | |
| 9,423,360 B1 | 8/2016 | Kostamo et al. | |
| 9,465,112 B2 | 10/2016 | Stettner | |
| 9,785,868 B2 * | 10/2017 | Nordbryhn | G01N 21/94 |
| 9,791,696 B2 | 10/2017 | Woltman et al. | |
| 9,797,995 B2 | 10/2017 | Gilliland et al. | |
| 9,834,209 B2 | 12/2017 | Stettner et al. | |
| 9,915,726 B2 | 3/2018 | Bailey et al. | |
| 10,048,163 B1 | 8/2018 | Yasovsky et al. | |
| 2002/0035455 A1 | 3/2002 | Niu et al. | |
| 2007/0165213 A1 * | 7/2007 | Fang | G01N 21/552 356/239.1 |
| 2013/0114076 A1 * | 5/2013 | Schleipen | G01N 21/7703 356/246 |
| 2015/0331113 A1 | 11/2015 | Stettner | |
| 2016/0231568 A1 | 8/2016 | Saarikko et al. | |
| 2018/0024232 A1 | 1/2018 | Gilliland | |
| 2018/0056993 A1 | 3/2018 | Stettner | |
| 2018/0080851 A1 | 3/2018 | Medower et al. | |
| 2018/0267672 A1 | 9/2018 | Wassvik et al. | |
| 2018/0275248 A1 | 9/2018 | Bailey | |
| 2021/0003511 A1 * | 1/2021 | Bergam | G01S 7/4814 |
| 2021/0055421 A1 * | 2/2021 | Rayford, II | G01S 7/497 |

FOREIGN PATENT DOCUMENTS

| | | |
|---|---|---|
| CN | 108508624 A | 9/2018 |
| CN | 108646426 A | 10/2018 |
| EP | 3553489 A1 | 10/2019 |
| JP | 2014085280 A | 5/2014 |
| WO | 99/52002 | 10/1999 |
| WO | 2001095027 A3 | 12/2001 |

OTHER PUBLICATIONS

B. Kress, "Digital Diffractive Optics: An Introduction to Planar Diffractive Optics and Related Technology" Wiley Press.

* cited by examiner

DETECTION OF DAMAGE TO OPTICAL ELEMENT OF ILLUMINATION SYSTEM

BACKGROUND

A solid-state Lidar system includes a photodetector, or an array of photodetectors, essentially fixed in place relative to a carrier, e.g., a vehicle. Light is emitted into the field of view of the photodetector and the photodetector detects light that is reflected by an object in the field of view. For example, a Flash Lidar system emits pulses of light, e.g., laser light, into essentially the entire field of view. The time of flight of the reflected photon detected by the photodetector is used to determine the distance of the object that reflected the light.

As an example, the solid-state Lidar system may be mounted on a vehicle to detect objects in the environment surrounding the vehicle and to detect distances of those objects for environmental mapping. The detection of reflected light is used to generate a 3D environmental map of the surrounding environment. The output of the solid-state Lidar system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

DETAILED DESCRIPTION

Figure 1:
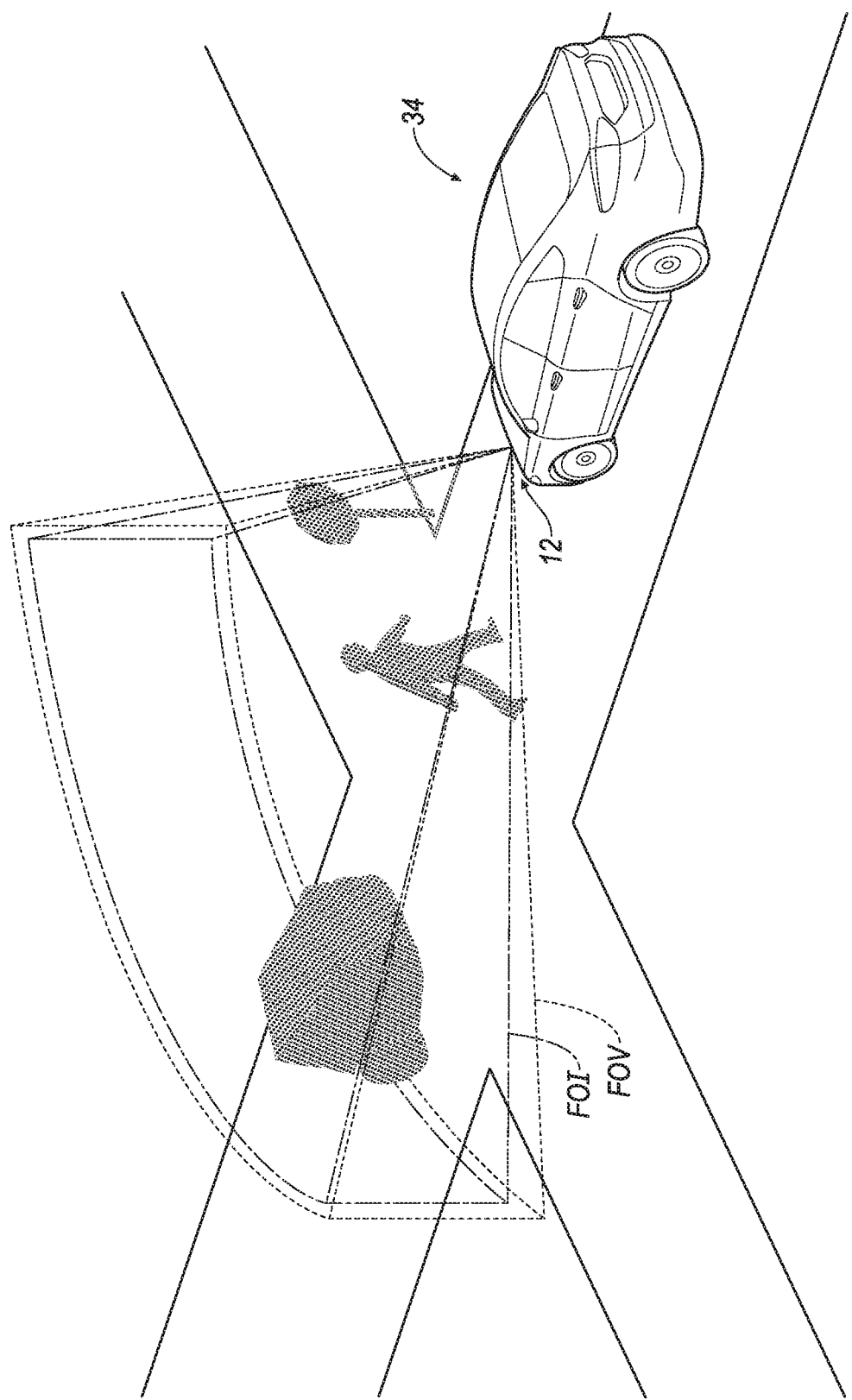
FIG. 1 is a perspective view of a vehicle including a Lidar system.

With reference to the Figures, wherein like numerals indicate like parts throughout the several views, a system 10 is generally shown. The system 10 may be a component of a light detection and ranging (Lidar) system 12. Specifically, the system 10 may be an illumination system of the Lidar system 12. The system 10 includes an assembly 14 having an optical element 16. The optical element 16 has a light-shaping region 18. The light-shaping region 18 has a light-shaping surface 46 that shapes light (e.g., diffuses, scatters, etc.) exiting the system 10, as described further below. To test the integrity of the optical element 16, a light emitter (hereinafter referred to as the "first light emitter 20") is aimed into the optical element 16 along an internal reflective path P. The internal reflective path P extends across the light-shaping region 18. A photodetector 22 is positioned along the internal reflective path P.

Figure 4:
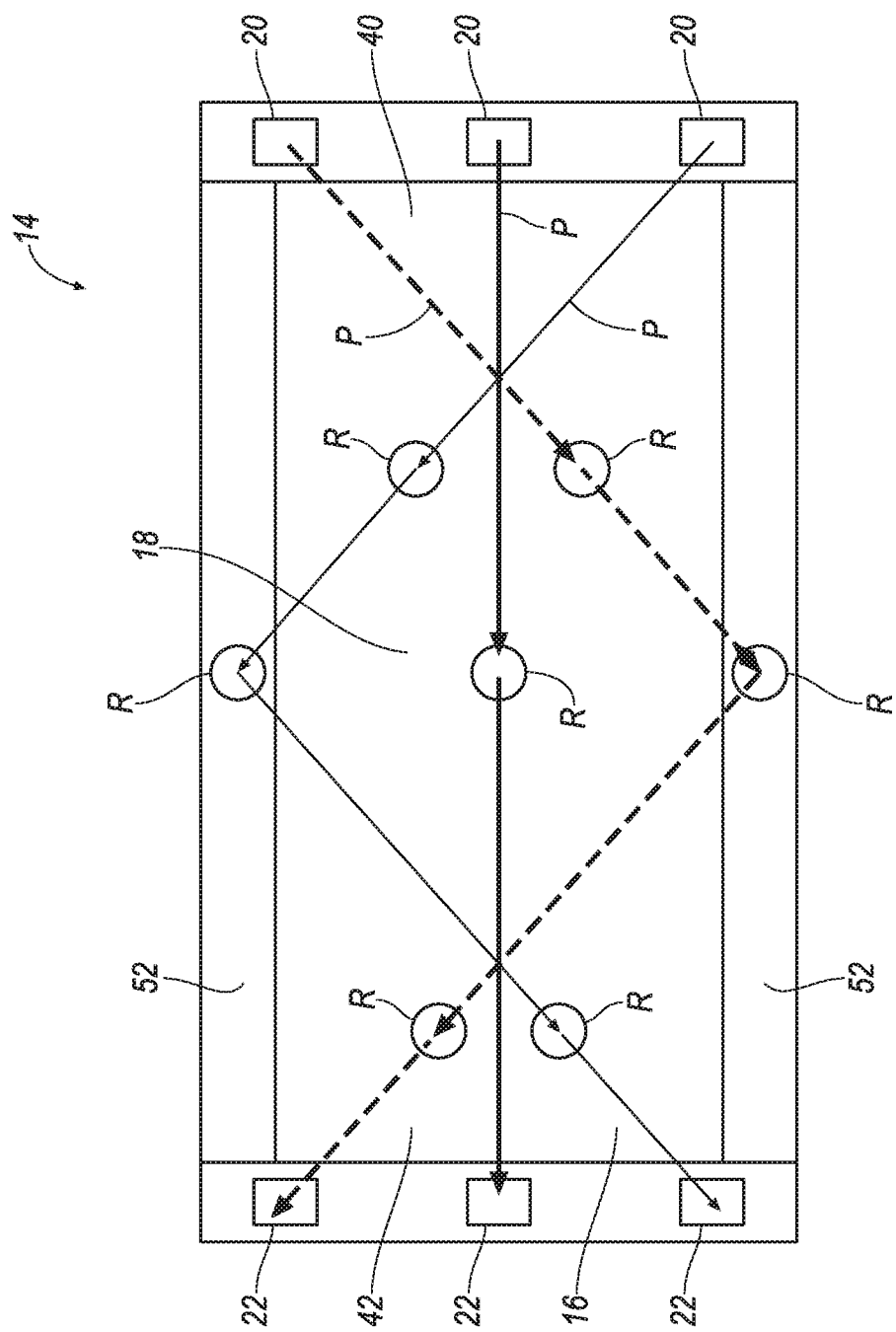
FIG. 4 is a top view of the assembly of FIG. 3.
Figure 5:
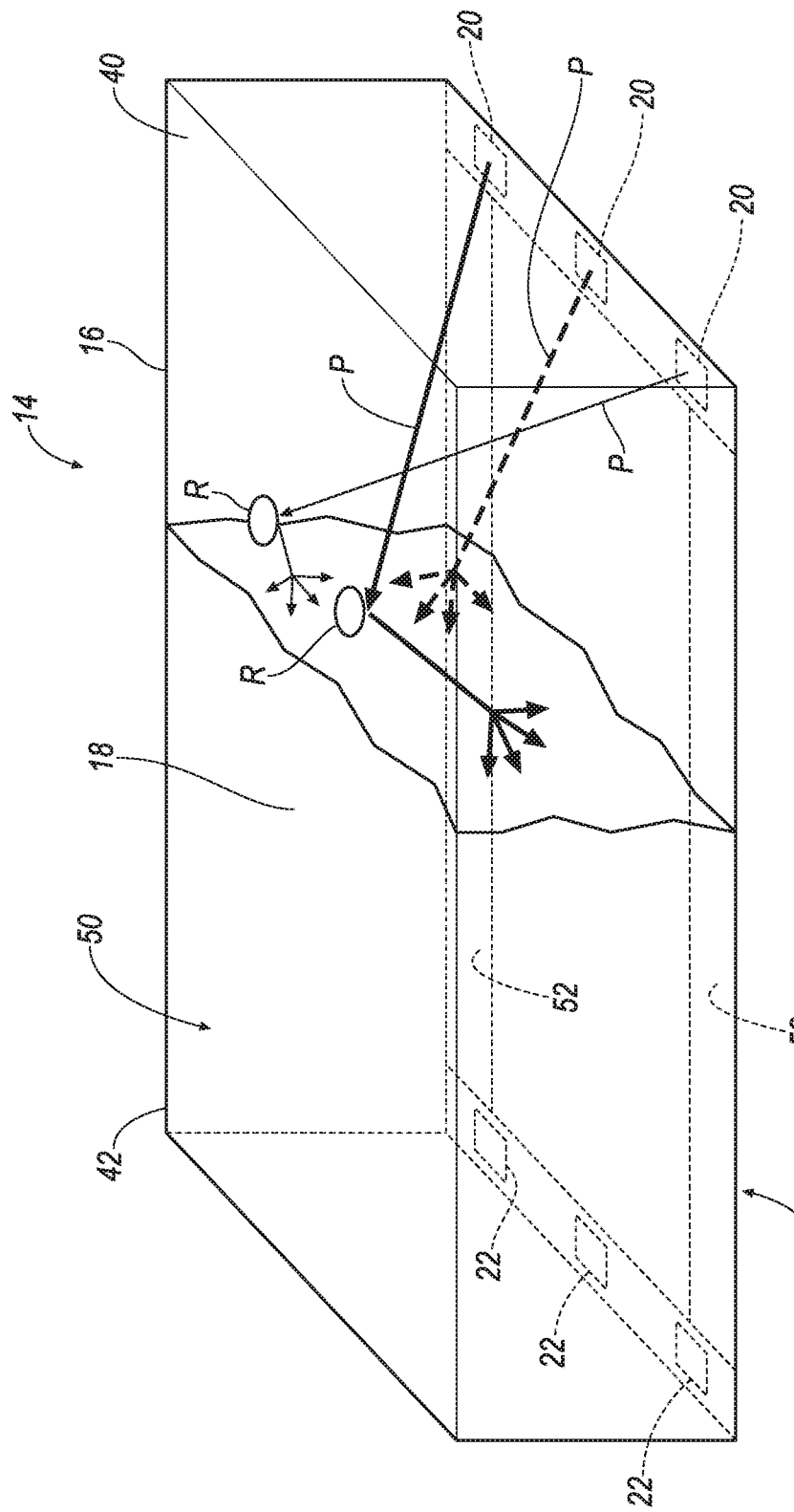
FIG. 5 is a perspective view of the assembly when the optical element is cracked.

The photodetector 22 detects light transmitted along the internal reflective path P from the first light emitter 20 to the photodetector 22. In the event the optical element 16 is intact, i.e., undamaged, the light from the first light emitter 20 reaches the photodetector 22 (FIG. 3), thus confirming the integrity of the optical element 16. In the event the optical element 16 is damaged, relatively less light emitted from the first light emitter 20 reaches the photodetector 22 (FIGS. 4 and 5). The system 10, e.g., the illumination system of the Lidar system 12, is disabled when damage to the optical element 16 is detected based on the lack of light received by the photodetector 22. When the light-shaping region 18 of the optical element 16, e.g., the light-shaping surface 46, is damaged, the light-shaping region 18 may not shape the light exiting the system 10. Thus, the detection of damage to the optical element 16, and the subsequent disablement of the system 10 prevents substantially all emission of the unshaped light (e.g., undiffused, unscattered, etc.) from the system 10.

Figure 8:
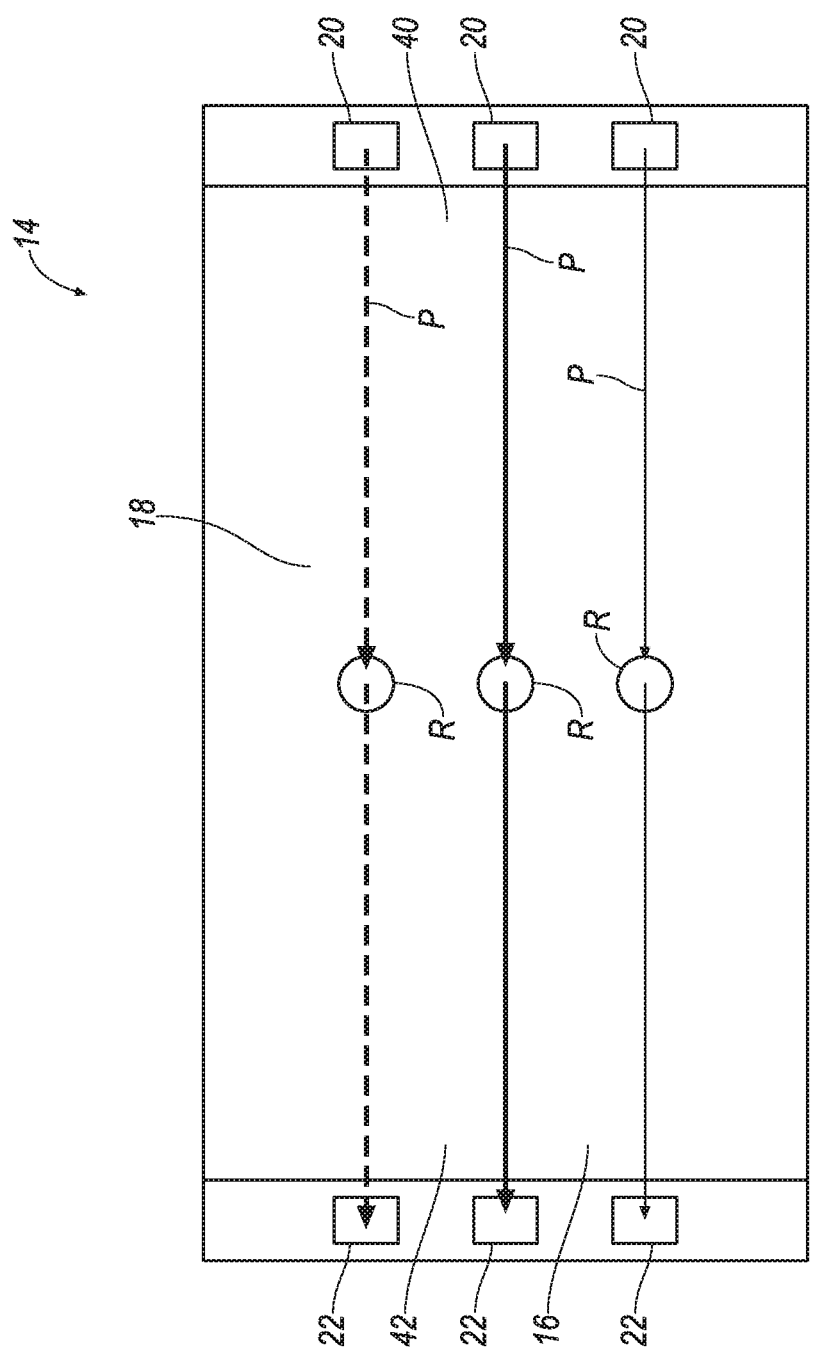
FIG. 8 is a top view of the assembly of FIG. 7.

As set forth above, the system 10 may be a component of a Lidar system 12. With reference to FIG. 1, the Lidar system 12 emits light and detects the emitted light that is reflected by an object, e.g., pedestrians, street signs, vehicles, etc. Specifically, the system 10 includes a light emitter (hereinafter referred to as the "second light emitter 24") that emits light through an exit window 26 to a field of illumination FOI. The light emitted from the second light emitter 24 is shaped by the light-shaping surface 46 of the optical element 16 before exiting the exit window 26. The Lidar system 12 includes a light-receiving system 28 (shown in FIG. 8 and described below) that has a field of view FOV that overlaps the field of illumination FOI and receives the reflected light. The light-receiving system 28 may include a photodetector 30 (FIG. 8) and receiving optics (not shown), as are known. A computer 32 is in communication with the second light emitter 24 for controlling the emission of light from the second light emitter 24. The computer 32 may be a component of the system 10 and/or the Lidar system 12.

The Lidar system 12 is shown in FIG. 1 as being mounted on a vehicle 34. In such an example, the Lidar system 12 is operated to detect objects in the environment surrounding the vehicle 34 and to detect distance of those objects for environmental mapping. The output of the Lidar system 12 may be used, for example, to autonomously or semi-autonomously control operation of the vehicle 34, e.g., propulsion, braking, steering, etc. Specifically, the Lidar system 12 may be a component of or in communication with an advanced driver-assistance system (ADAS) of the vehicle 34. The Lidar system 12 may be mounted on the vehicle 34 in any suitable position and aimed in any suitable direction. As one example, the Lidar system 12 is shown on the front of the vehicle 34 and directed forward. The vehicle 34 may have more than one Lidar system 12 and/or the vehicle 34 may include other object detection systems, including other Lidar systems. The vehicle 34 is shown in FIG. 1 as including a single Lidar system 10 aimed in a forward direction merely as an example. The vehicle 34 shown in the Figures is a passenger automobile. As other examples, the vehicle 34 may be of any suitable manned or un-manned type including a plane, satellite, drone, watercraft, etc.

The Lidar system 12 may be a solid-state Lidar system. In such an example, the Lidar system 12 is stationary relative to the vehicle 34. For example, the Lidar system 12 may include a casing 36 (shown in FIG. 2 and described below) that is fixed relative to the vehicle 34, i.e., does not move relative to the component of the vehicle 34 to which the casing 36 is attached, and a silicon substrate of the Lidar system 12 is supported by the casing 36.

As a solid-state Lidar system, the Lidar system 12 may be a flash Lidar system. In such an example, the Lidar system 12 emits pulses of light into the field of illumination FOI. More specifically, the Lidar system 12 may be a 3D flash Lidar system that generates a 3D environmental map of the surrounding environment, as shown in part in FIG. 1. An example of a compilation of the data into a 3D environmental map is shown in the field of view FOV and the field of illumination FOI in FIG. 1.

In such an example, the Lidar system 12 is a unit. For example, with reference to FIG. 2, the casing 36 may enclose the other components of the Lidar system 12 and may include mechanical attachment features to attach the casing 36 to the vehicle 34 and electronic connections to connect to and communicate with electronic system 10 of the vehicle 34, e.g., components of the ADAS. For example, the exit window 26 extends through the casing 36 and the casing 36 houses the assembly 14 and the second light emitter 24. The exit window 26 includes an aperture extending through the casing 36 and may include a lens in the aperture.

The casing 36, for example, may be plastic or metal and may protect the other components of the Lidar system 12 from environmental precipitation, dust, etc. In the alternative to the Lidar system 12 being a unit, components of the Lidar system 12, e.g., the second light emitter 24 and the light-receiving system 28, may be separated and disposed at different locations of the vehicle 34.

With continued reference to FIG. 1, the second light emitter 24 emits light into the field of illumination FOI for detection by the light-receiving unit when the light is reflected by an object in the field of view FOV. The second light emitter 24 may be, for example, a laser. The second light emitter 24 may be, for example, a semiconductor laser. In one example, the second light emitter 24 is a vertical-cavity surface-emitting laser (VCSEL). As another example, the second light emitter 24 may be a diode-pumped solid-state laser (DPSSL). As another example, the second light emitter 24 may be an edge emitting laser diode. The second light emitter 24 may be designed to emit a pulsed flash of light, e.g., a pulsed laser light. Specifically, the second light emitter 24, e.g., the VCSEL or DPSSL or edge emitter, is designed to emit a pulsed laser light. The light emitted by the second light emitter 24 may be, for example, infrared light. Alternatively, the light emitted by the second light emitter 24 may be of any suitable wavelength. The Lidar system 12 may include any suitable number of second light emitters 24, i.e., one or more in the casing 36. In examples that include more than one second light emitter 24, the second light emitters 24 may be identical or different.

Figure 2:
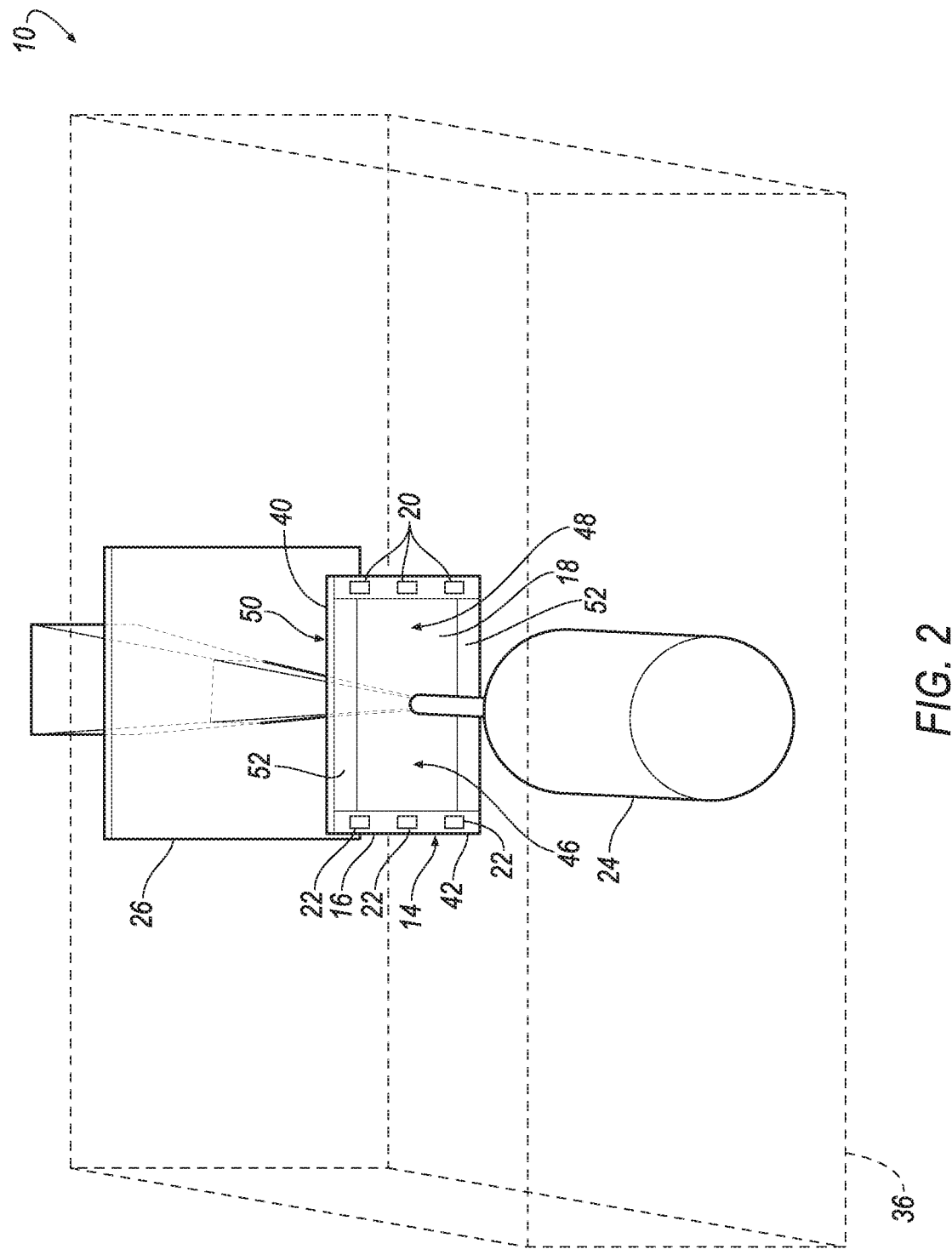
FIG. 2 is perspective view of an illumination system of the Lidar system.

With reference to FIG. 2, the second light emitter 24 may be stationary relative to the casing 36. In other words, the second light emitter 24 does not move relative to the casing 36 during operation of the system 10, e.g., during light emission. The second light emitter 24 may be mounted to the casing 36 in any suitable fashion such that the second light emitter 24 and the casing 36 move together as a unit.

As set forth above, the Lidar system 12 may be a staring, non-moving system. As another example, the Lidar system 12 may include elements to adjust the aim of the Lidar system 12. For example, the Lidar system 12 may include a beam steering device (not shown) that directs the light from the second light emitter 24 into the field of illumination FOI. The beam steering device may be a micromirror. For example, the beam steering device may be a micro-electro-mechanical system (MEMS) mirror. As an example, the beam steering device may be a digital micromirror device (DMD) that includes an array of pixel-mirrors that are capable of being tilted to deflect light. As another example, the MEMS mirror may include a mirror on a gimbal that is tilted, e.g., by application of voltage. As another example, the beam steering device may be a liquid-crystal solid-state device. As another example, the Lidar system 12 may be a scanning Lidar system in which the optical element 16 and the photodetector 30 are fixed in position relative to each other.

As set forth above, the second light emitter 24 is aimed at the optical element 16. Specifically, the second light emitter 24 is aimed at the light-shaping surface 46 of the optical element 16. The second light emitter 24 may be aimed directly at the optical element 16 or may be aimed indirectly at the optical element 16 through intermediate reflectors/deflectors, diffusers, optics, etc.

As set forth above, the assembly 14 includes the optical element 16, the first light emitter 20, and the photodetector 22. As described further below, the assembly 14 may include more than one first light emitter 20 and photodetector 22 with the first light emitters 20 and photodetectors 22 arranged in pairs. The light-shaping region 18 of the optical element 16, specifically the light-shaping surface 46, shapes the light, e.g., by diffusion, scattering, etc. The light-shaping region 18, including the light-shaping surface 46, may be transmissive, as shown in FIG. 2, i.e., transmits light from the second light emitter 24 through the light-shaping region 18. In other words, the optical element 16 is designed to transmit light from the second light emitter 24. As another example, the light-shaping region 18 may be reflective, i.e., reflects light from the second light emitter 24. In other words, the optical element 16 is designed to reflect light from the second light emitter 24. In an example in which the light-shaping region 18 is reflective, the light-shaping surface 46 may be a coating on a relatively less transmissive substrate. In such an example, the internal reflective path P is in the coating. In other words, the second light emitter 24 emits light into the coating and the light is internally reflected in the coating, i.e., by total internal reflection (TIR), from the second light emitter 24 to the photodetector 22.

The second light emitter 24 aimed externally at the light-shaping region 18, including the light-shaping surface 46 (in contrast with the internal reflective path P of the light of the first light emitter 20). In other words, the second light emitter 24 is aimed at an exterior of the light-shaping region 18 and is transmitted through and exits the light-shaping region 18 or is externally reflected by the light-shaping region 18. Specifically, when transmitted through the light-shaping region 18, the light from the second light emitter 24 enters a front side 48 of the optical element 16 and exits a back side 50 of the optical element 16, and the optical element 16 shapes the light. The front side 48 and the back side 50 are opposite each other. When reflected by the light-shaping region 18, the light from the second light emitter 24 is externally reflected by the light-shaping region 18.

The optical element 16 shapes light that is emitted from the second light emitter 24. Specifically, the second light emitter 24 is aimed at the optical element 16, i.e., substantially all of the light emitted from the second light emitter 24 reaches the optical element 16. As one example of shaping the light, the optical element 16 diffuses the light, i.e., spreads the light over a larger path and reduces the concentrated intensity of the light. In other words, the optical element 16 is designed to diffuse the light from the second light emitter 24. As another example, the optical element 16 scatters the light, e.g., a hologram). "Unshaped light" is used herein to refer to light that is not shaped, e.g., not diffused or scattered, by the optical element 16, e.g., resulting from damage to the optical element 16. Light from the second light emitter 24 may travel directly from the second light emitter 24 to the optical element 16 or may interact with additional components between the second light emitter 24 and the optical element 16. The shaped light from the optical element 16 may travel directly to the exit window 26 or may interact with additional components between the optical element 16 the exit window 26 before exiting the exit window 26 into the field of illumination FOI.

The optical element 16 directs the shaped light to the exit window 26 for illuminating the field of illumination FOI exterior to the Lidar system 12. In other words, the optical element 16 is designed to direct the shaped light to the exit window 26, i.e., is sized, shaped, positioned, and/or has optical characteristics to direct at least some of the shaped light to the exit window 26.

The optical element 16 may be of any suitable type that shapes and directs light from the second light emitter 24 toward the exit window 26. For example, the optical element 16 may be or include a diffractive optical element, a diffractive diffuser, a refractive diffuser, a computer-generated hologram, a blazed grating, etc. The optical element 16 shown in FIGS. 3-10 is relatively thick for illustrative purposes to show the internal reflective path P. The optical element 16 may have any suitable thickness that achieves total internal reflection.

Figure 6:
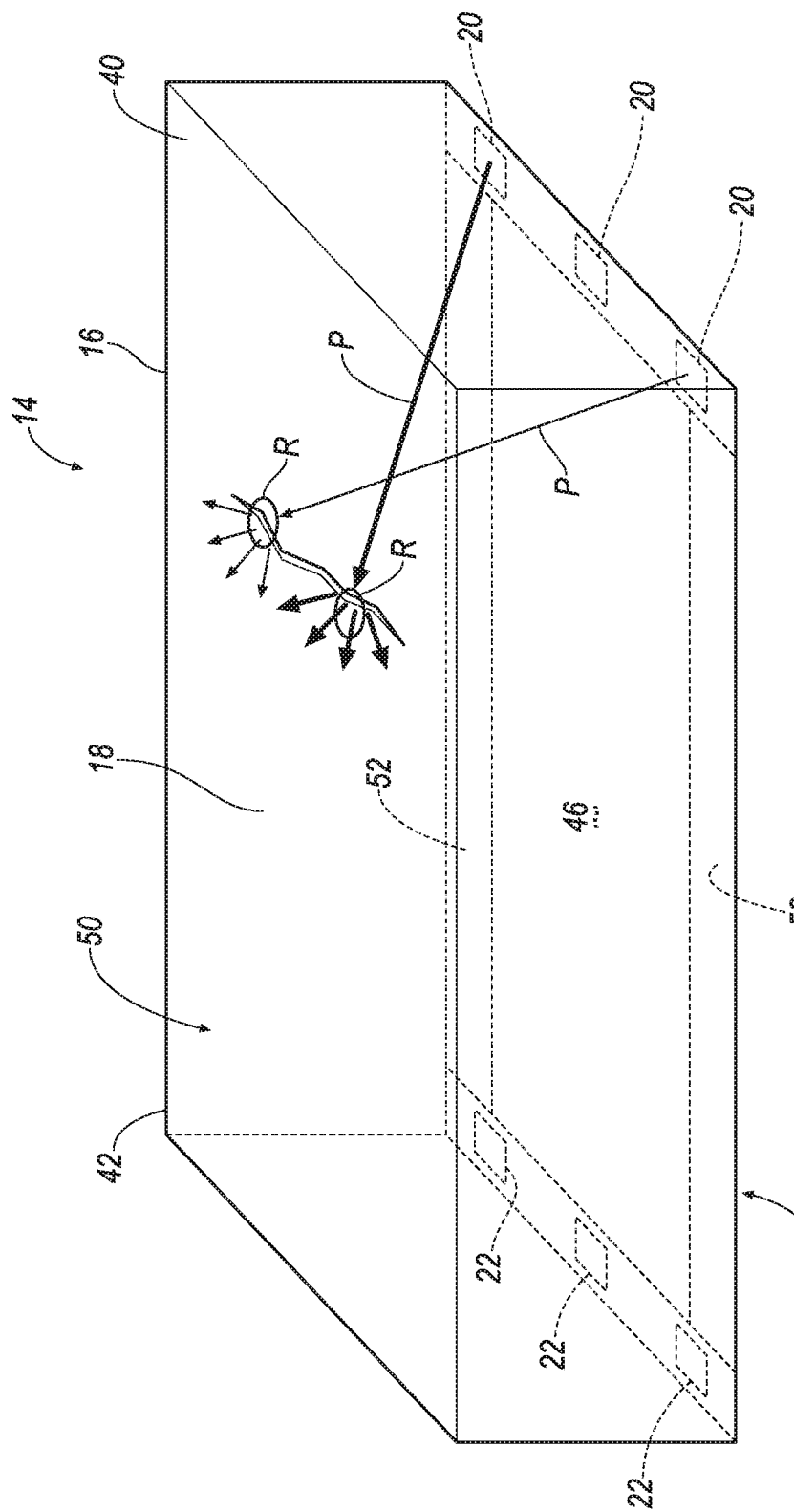
FIG. 6 is a perspective view of the assembly when the optical element has surface damage.

The assembly 14 is designed to detect damage to the optical element 16. Damage includes a crack in the optical element 16 and surface damage (e.g., at the front side 48 and/or the back side 50) including melting. As set forth above, the assembly 14 includes the first light emitter 20 and the photodetector 22. The first light emitter 20 is aimed at the photodetector 22 across the light-shaping region 18. Damage to the optical element 16 is determined based on the amount of light from the first light emitter 20 detected by the photodetector 22. In the event the optical element 16 is cracked, as shown in FIG. 5, the crack disrupts the path of light from the first light emitter 20 to the photodetector 22 such that less light (including no light) from the first light emitter 20 reaches the photodetector 22. Similarly, in the event of the optical element 16 has surface damage, as shown in FIG. 6, the surface damage disrupts the internal reflection of the light from the first light emitter 20 such that less light (including no light) from the first light emitter 20 reaches the photodetector 22.

If the photodetector 22 detects substantially all of the light emitted by the first light emitter 20, the system 12 confirms that the optical element 16 is undamaged, i.e., intact. In such situations, the second light emitter 24 is operational. If the photodetector 22 detects a relatively low amount of light from the first light emitter 20, the system 10 identifies the optical element 16 as damaged. In such situations, the second light emitter 24 is disabled, e.g., the system 10 no longer powers the second light emitter 24 to emit light at the optical element 16 and/or active step is taken to physically disable or block light from the second light emitter 24 to the optical element 16. The system 12 may compare the amount of light from the first light emitter 20 detected by the photodetector 22 to a threshold level. In such examples, the second light emitter 24 is operational when the light detected by the photodetector 22 is above the threshold level, and the system 12 disables the second light emitter 24 when the light detected by the photodetector 22 is below the threshold level. The threshold level may be predetermined and stored in memory of the computer 32.

As set forth above, the first light emitter 20 is aimed at the photodetector 22 across the light-shaping region 18. Specifically, the optical element 16 has a bulk substrate having first region 40, a second region 42, and the light-shaping region 18. The light-shaping region 18 is between the first region 40 and the second region 42. The photodetector 22 is supported on the first region 40 and the first light emitter 20 is supported on the second region 42. The bulk substrate of the optical element 16 may be, for example, plastic, glass, crystal, etc. As set forth further below, the light-shaping surface 46 is a coating on or is embedded in the bulk substrate of the light-shaping region.

The assembly 14 is designed so that light emitted by the first light emitter 20 is reflected internally in the optical element 16 from the first light emitter 20 to the photodetector 22. Light emitted by the first light emitter 20 travels along the internal reflective path P from the first light emitter 20 to the photodetector 22. In other words, substantially all of the light emitted by the first light emitter 20 is reflected internally from the first light emitter 20 to the photodetector 22 (when the optical element 16 is intact). The light emitted by the first light emitter 20 in the optical element 16 may be internally reflected more than once between the first light emitter 20 and the photodetector 22.

With reference to FIGS. 3-10, the assembly includes a diffractive element 52 at the front side 48. The diffractive element 52 may be on the front side 48 or may be embedded in the front side 48. The diffractive element 52 may be, for example, a diffractive grating, a holographic grating, etc. Such gratings may include periodic structures that cause the diffraction of light. The grating may be etched into the bulk substrate of the optical element 16 on the front side 48. As another example, the grating may be a material, e.g., a polymer, deposited on the front side 48 and subsequently etched. The diffractive element 52 is along the internal reflective path P between the light emitter 20 and the photodetector 22.

The diffractive element 52 has a different index of refraction, e.g., a lower index of refraction, than the bulk material of the optical element 16. Accordingly, the diffractive element 52 alters the critical angle at the interface between the optical element 16 and the diffractive element 52 as compared to the critical angle at the interface between the optical element 16 and air.

Figure 9:
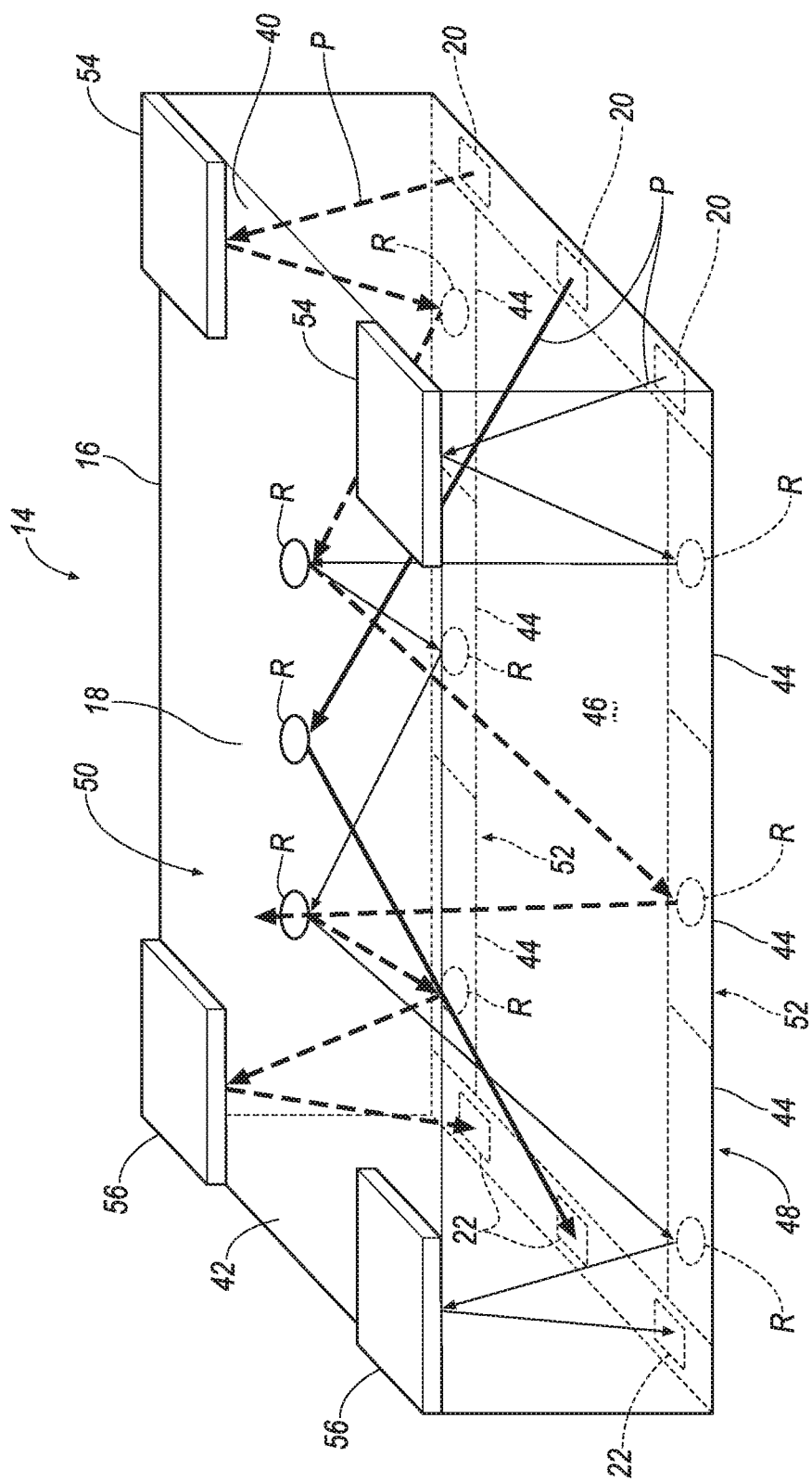
FIG. 9 is a perspective view of another example of the assembly.

The assembly 14 may include more than one diffractive element 52. For example, the example in FIGS. 3-5 include two diffractive element 52 on a common side (e.g., the front side 48) of the optical element 16 and opposite sides of the light-shaping surface 46. Each diffractive element 52 may have a constant index of refraction. As another example, the diffractive element 52 may have different portions 44 each having a different index of refraction (FIG. 9). In such an example, the different portions 44 are designed to have the appropriate critical angle at the interface between the optical element 16 and the diffractive element 52 to create total internal reflection at the back side 50. In examples including multiple diffractive elements 52, e.g., the example in FIG. 9, multiple diffractive elements 52 may have the same or a different index of refraction.

Figure 3:
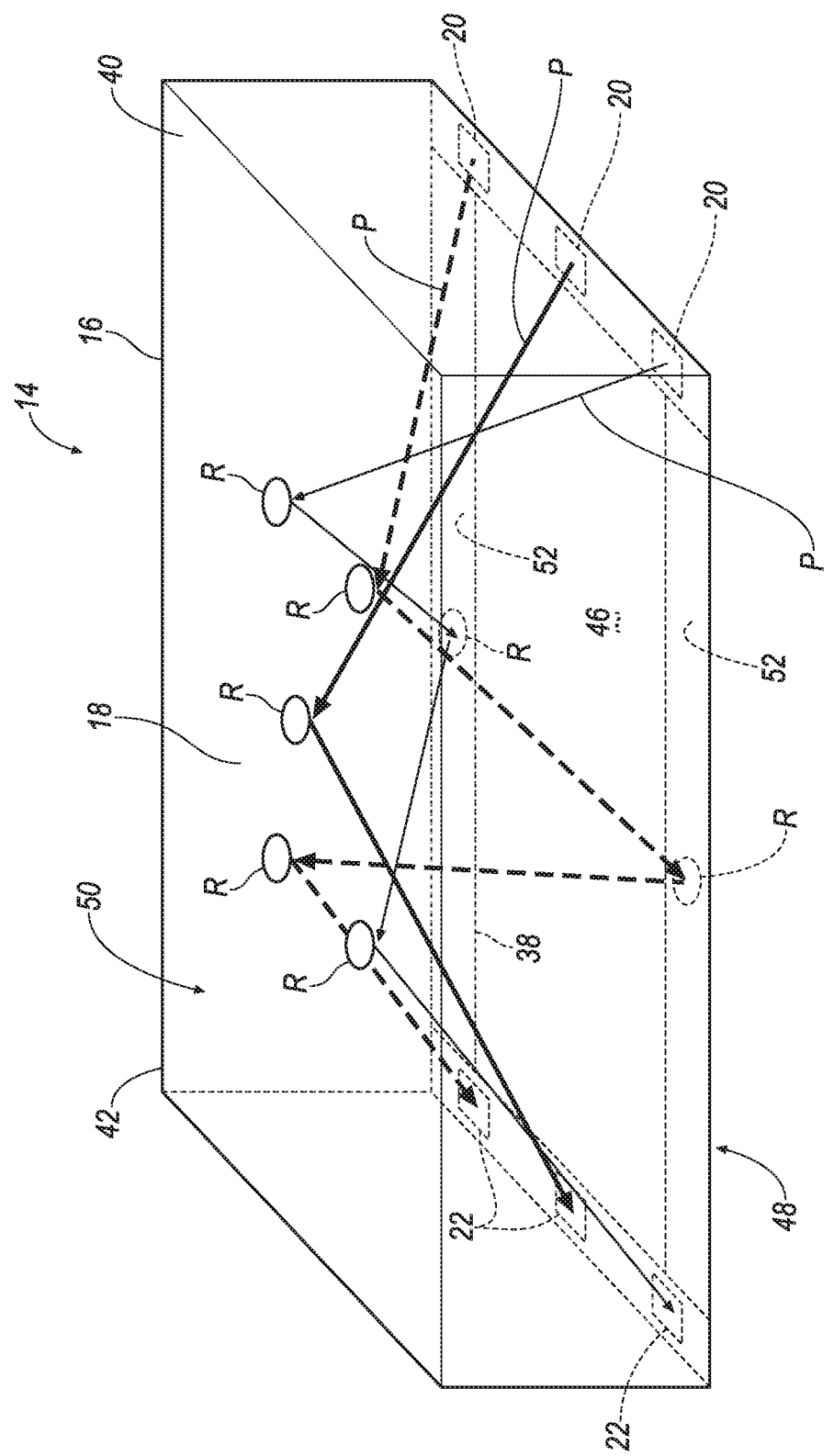
FIG. 3 is a perspective view of an assembly including an optical element, light emitters aimed along internal reflective paths, and photodetectors positioned along the internal reflective paths.
Figure 7:
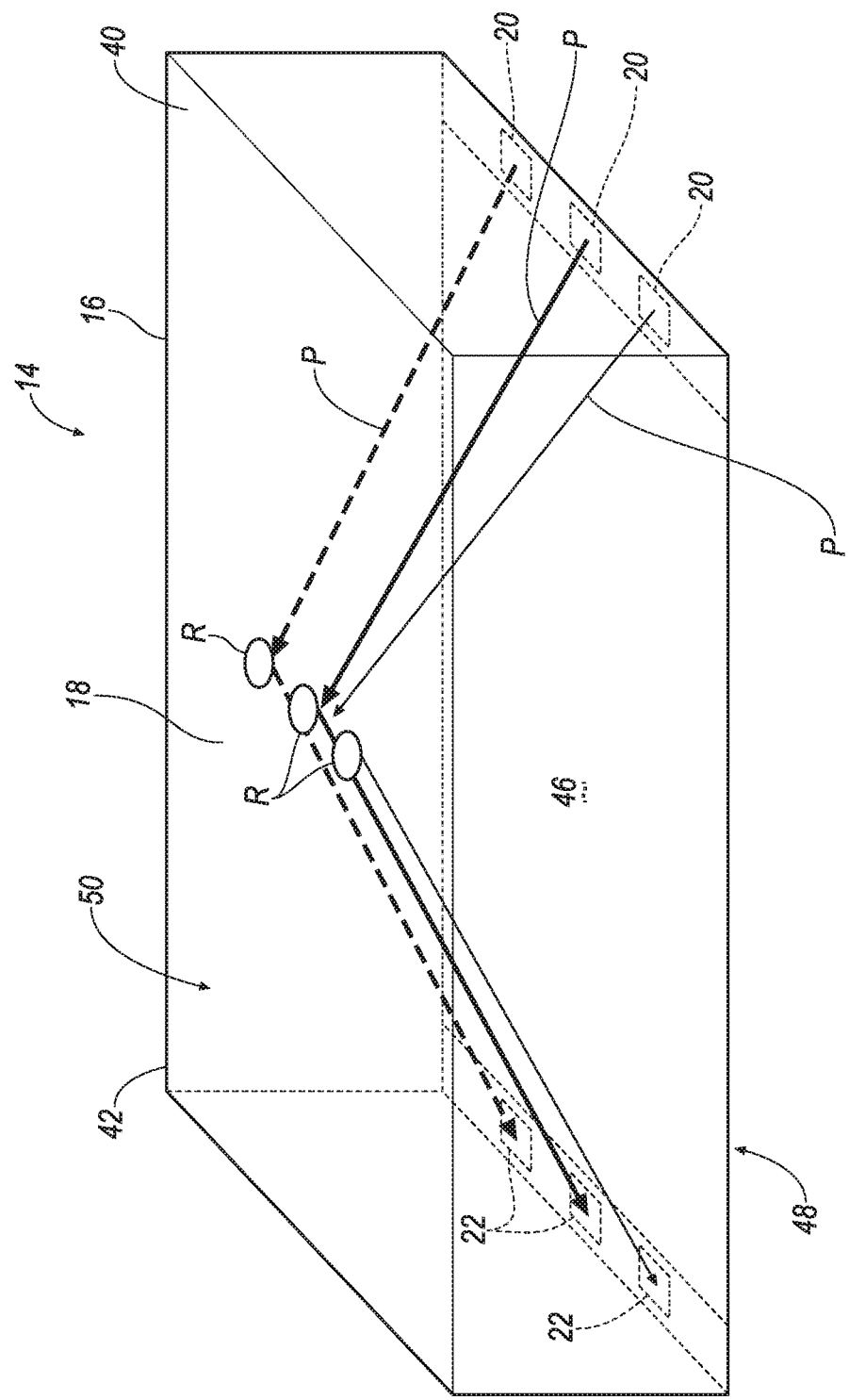
FIG. 7 is a perspective view of another example of the assembly.

With reference to FIGS. 3 and 7, the assembly 14 is designed to internally reflect the light from the first light emitter 20 by total internal reflection at the back side 50 and by reflection by the diffractive element. 52 at the front side 48. The diffractive element 52 is designed to reflect light (i.e., light generated by the light emitter 20) from the front side 48 at an angle that results in total internal reflection at the back side 48 (e.g., at the points of reflection R in FIGS. 3-10). For example, with reference to FIG. 3, the light from the light emitter 20 is aimed to be internally reflected by total internal reflection at an interface between the optical element 16 and air, i.e., at an angle of incidence greater than the critical angle at the interface between the optical element 16 and air. As an example, the grating, i.e., the periodic structures of the grating, is designed to reflect the light at the appropriate angle for TIR. The points of reflection R are schematically identified with circles in FIGS. 3-10. Total internal reflection is the complete reflection of the light within the optical element 16. Total internal reflection occurs when the angle of incidence is greater than the critical angle, as is known.

As set forth above, the first light emitter 20 is aimed into the optical element 16 along the internal reflective path P between the first light emitter 20 and the photodetector 22. The internal reflective path P extends across the light-shaping region 18. The assembly 14 may include any suitable number of pairs of first light emitters 20 and photodetectors 22. Each first light emitter 20 has a photodetector 22 along the internal reflective path P of the respective light emitter 20. The number of pairs of first light emitters 20 and photodetectors 22 as well as the aim of first light emitters 20, i.e., the internal reflective path P, may be designed to provide adequate coverage to detect most or all damage to the optical element 16.

Figure 10:
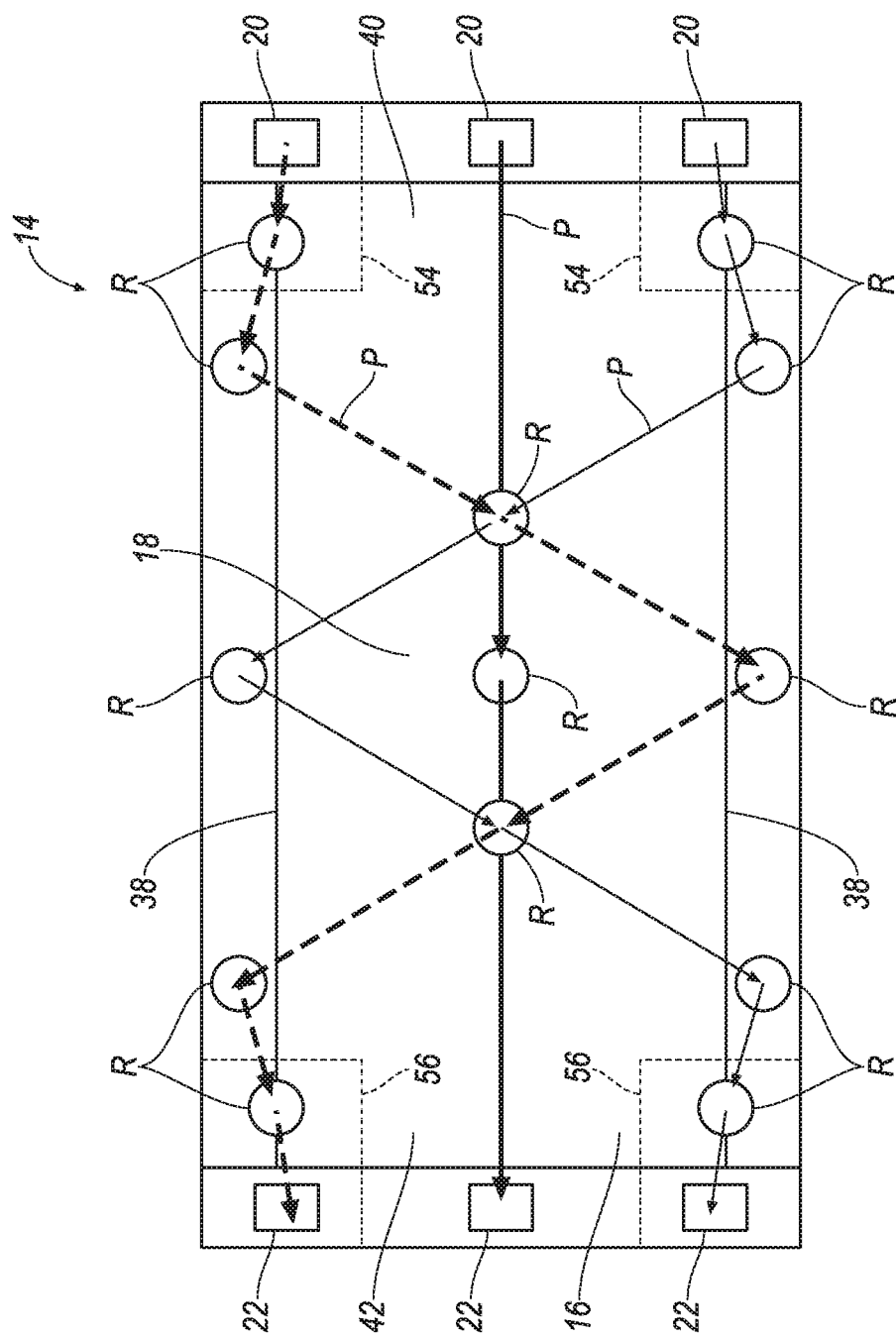
FIG. 10 is a top view of the assembly of FIG. 9.

With reference to FIGS. 9 and 10, the assembly 14 may include an input-light coupling 54 and/or an output light-coupling 56. The input-light coupling 54 reflects light from the light emitter 20 into the bulk substrate, e.g., toward the diffractive element 52, at a suitable angle to achieve TIR at the back side 50. The output-light coupling 56 reflects light from the bulk substrate to the photodetector 22. The light emitter 20 may be aimed directly at the input-light coupling 54, i.e., with the light traveling through the bulk substrate from the light emitter 20 to the diffractive element 52 without interaction with other intermediate elements. The output-light coupling 56 may be aimed directly at the photodetector 22, i.e., with the light traveling through the bulk substrate from the output-light coupling 56 to the photodetector 22 without interaction with other intermediate elements.

The input-light coupling 54 and the output-light coupling 56 may be identical to each other or different. The input-light coupling 54 and the output-light coupling 56 may be, for example, a diffractive grating, a holographic grating, etc. The input-light coupling 54 and the output-light coupling 56 may have a different index of refraction than the diffractive element 52. The input-light coupling 54 and the output-light coupling 56 are on the back side 50 in the example shown in FIGS. 9 and 10.

The term "reflected" is used herein to include reflectively diffracted light (e.g., by the diffractive element 52, the input-light coupling 54, the output-light coupling 56, etc.). For example, "reflected" includes light that is totally or partially reflected by a diffractive grating.

As set forth above, the first light emitter 20 and the photodetector 22 are supported on the first region 40 and the second region 42, respectively, of the optical element 16. By way of example the first light emitter 20 and the photodetector 22 are on a common side of the optical element 16. In the example shown in the Figures, the first light emitter 20 and the photodetector 22 are on the front side 48. In such examples, the light-shaping surface 46 and the diffractive element 52 are on the front side 48. As another example, the first light emitter 20 and the photodetector 22 may be on the edge of the optical element 16, i.e., opposing edges of the optical element 16.

The photodetector 22 is positioned along the internal reflective path P. In other words, the photodetector 22 is positioned such that, when the first light emitter 20 emits light into the optical element 16, light from the first light emitter 20 is internally reflected and reaches the photodetector 22.

The "photodetector 22" includes a single photodetector or an array of photodetectors (including 1D arrays, 2D arrays, etc.). The photodetector 22 may be, for example, an avalanche photodiode detector or PIN detector. As one example, the photodetector 22 may be a single-photon avalanche diode (SPAD).

The system 10 may accommodate for light entering the exit window 26. In such an example, the system 10 may include a baffle (not shown) between the photodetector 22 and the exit window 26, as described further below. The baffle is positioned to shield the photodetector 22 from light passing through the exit window 26, i.e., exterior light shining into the exit window 26. The baffle prevents interference by exterior light such that substantially all of the light detected by the photodetector 22 is emitted from the first light emitter 20. This improves the accuracy of the calculation based on detection of light by the photodetector 22. The baffle may be, for example, a design of the exit window 26, an interior wall between the exit window 26 and the photodetector 22, a band-pass filter between the exit window 26 and the photodetector 22, and/or a closable shutter at the exit window 26.

Figure 11:
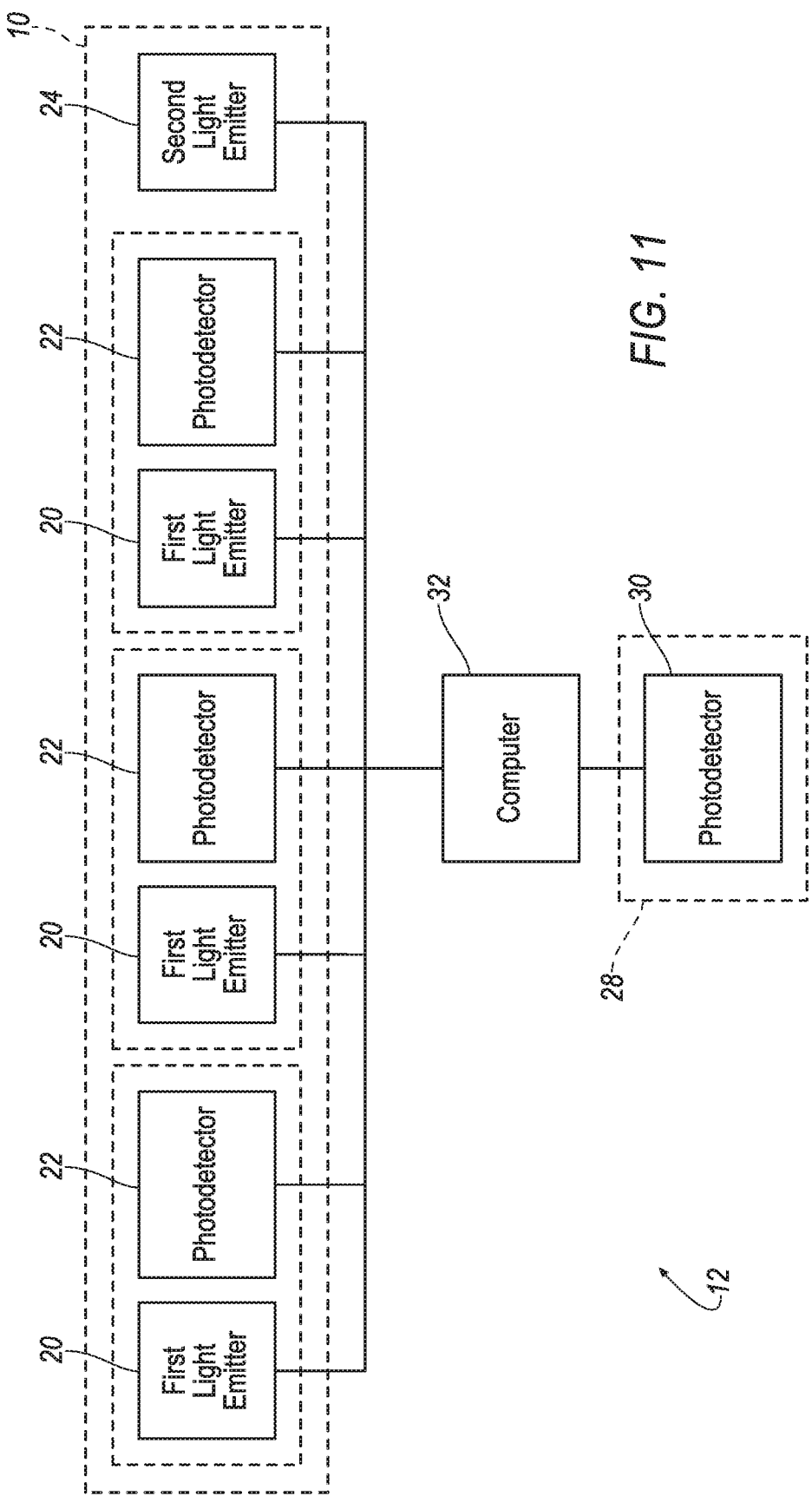
FIG. 11 is a block diagram of the Lidar system.

With reference to FIG. 11, the Lidar system 12 may include the computer 32. The computer 32 is in communication with the first light emitter 20 for powering the first light emitter 20. The computer 32 is in communication with the photodetector 22 to detect the light emitted by the first light emitter 20 and internally reflected in the optical element 16. The computer 32 is also in communication with the second light emitter 24. The computer 32 controls the second light emitter 24, e.g., decides whether the second light emitter 24 is powered or disabled, based on the detection of light by the photodetector 22. Specifically, if the photodetector 22 detects the internally reflected light from the first light emitter 20, the computer 32 instructs the activation of the second light emitter 24 to illuminate a scene for range detection. The computer 32 is in communication with the photodetector 22 to detect the range of objects in the illuminated scene. If the photodetector 22 does not detect sufficient light from the first light emitter 20, this is an indication that the optical element 16 is damaged and, accordingly, the computer 32 disables the second light emitter 24.

The computer 32 may be a microprocessor-based controller or field programmable gate array (FPGA), or a combination of both, implemented via circuits, chips, and/or other electronic components. In other words, the computer 32 is a physical, i.e., structural, component of the system. For example, the computer 32 includes a processor, memory, etc. The memory of the computer 32 may store instructions executable by the processor, i.e., processor-executable instructions, and/or may store data. The computer 32 may be in communication with a communication network of the vehicle 34 to send and/or receive instructions from the vehicle 34, e.g., components of the ADAS.

Figure 12:
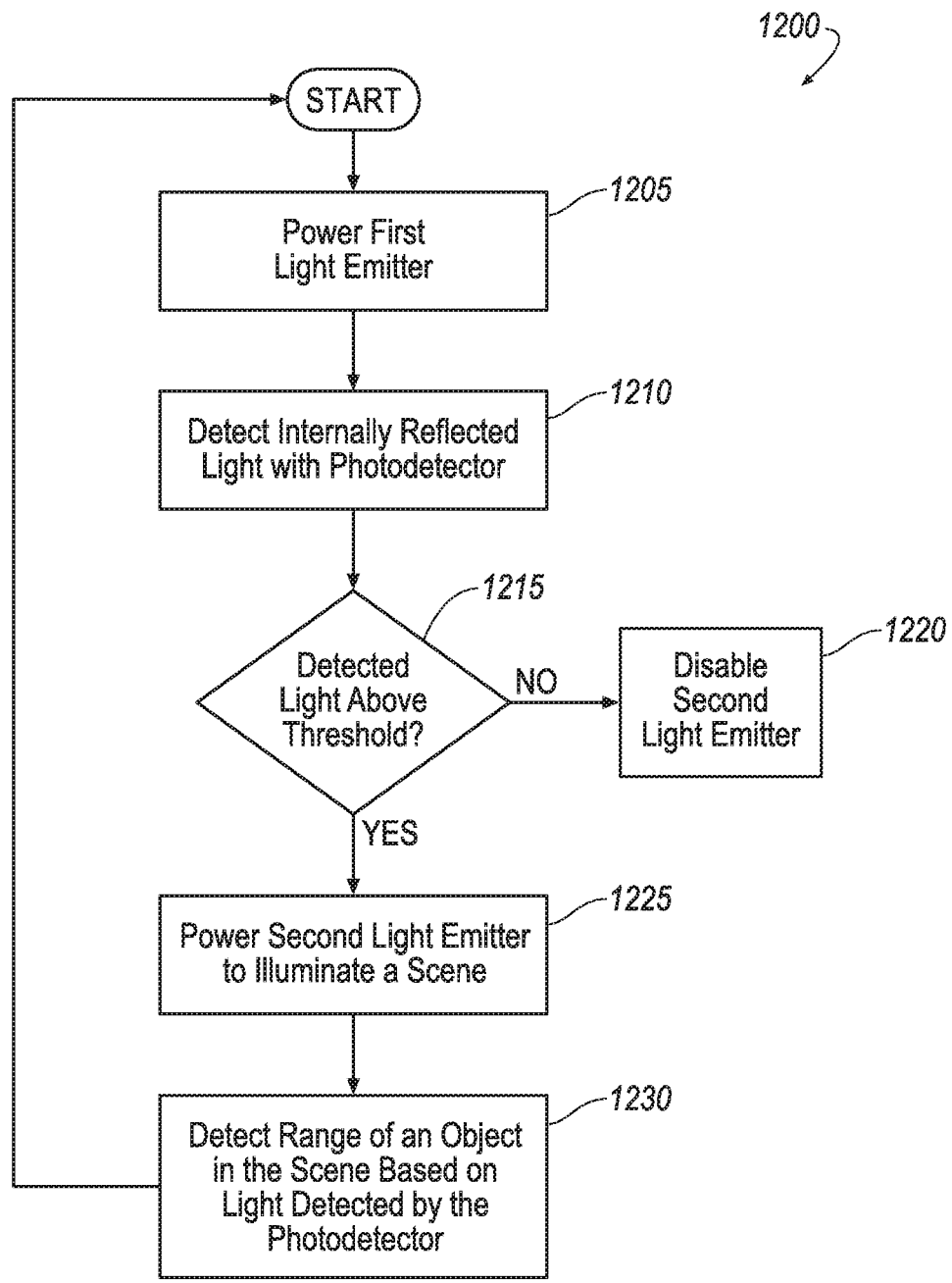
FIG. 12 is a method performed by the Lidar system and/or the vehicle.

Specifically, the instructions stored on the memory of the computer 32 include instructions to perform the method 900 in FIG. 12. Use herein (including with reference to the method 900 in FIG. 12) of "based on," "in response to," and "upon determining," indicates a causal relationship, not merely a temporal relationship.

The method 900 shown in FIG. 12 is initiated to illuminate a scene, e.g., external to the vehicle 34, and to determine range of objects in the scene. The scene is illuminated only if no damage to the optical element 16 is detected. The computer 32 may initiate the method 900 based on, for example, instructions from an ADAS of the vehicle 34.

With reference to block 905, the memory stores instructions to power the first light emitter 20. In examples including more than one first light emitter 20, each of the first light emitters 20 may be simultaneously powered. When powered, the first light emitter 20 emits light into the optical element 16. In particular, the first light emitter 20 emits light along the internal reflective path P in the optical element 16 to the photodetector 22.

With reference to block 910, the memory stores instructions to detect internally reflected light, i.e., light reflected internally in the optical element 16, with the photodetector 22. The photodetector 22 may be powered at a suitable time to detect the light emitted by the first light emitter 20. In other words, the timing for powering the photodetector 22 may be based on the timing for powering the first light emitter 20. In examples including multiple pairs of first light emitters 20 and photodetectors 22, block 910 includes receiving light detection from each of the photodetectors 22.

In decision block 915, the memory stores instructions to determine whether the optical element 16 is damaged based on the detection of light by the photodetector 22. Specifically, the memory may store instructions to compare the detection of light by the photodetector 22 with a threshold level.

The memory stores instructions to disable the second light emitter 24 based on a detection by the photodetector 22 indicating that the optical element 16 is damaged. The memory stores instructions to determine that the optical element 16 is damaged based on an amount of light along the internal reflective path P from the light emitter that is detected by the photodetector 22. Specifically, in the event the detected light is below the threshold level, the second light emitter 24 is disabled, as shown in block 920. Specifically, in block 920, the second light emitter 24 is not powered and/or active steps are taken to physically disable or block light from the second light emitter 24 to the optical element 16.

With reference to block 925, the memory stores instructions to power the second light emitter 24 to illuminate a scene, e.g., a scene exterior to the vehicle 34, based on detection by the photodetector 22 indicating that the optical element 16 is intact, i.e., undamaged. In other words, when no damage is detected, e.g., before determining that the optical element 16 is damaged, the memory stores instructions to power the second light emitter 24 aimed at the optical element 16 to diffuse the light with the optical element 16. Specifically, in the event the detected light by the photodetector 22 is above the threshold level, the second light emitter 24 is powered, as shown in block 925.

The signal from the photodetector 22 indicating that the optical element 16 is undamaged may trigger powering of the second light emitter 24. Accordingly, in the absence of a signal from the photodetector 22 indicating that the optical element 16 is undamaged, the computer 32 does not power the second light emitter 24.

The powering of the second light emitter 24 results in emission of light from the second light emitter 24 to the optical element 16, which diffuses the light and directs the light through the exit window 26 to illuminate the scene. With reference to block 930, the memory stores instructions to detect a range of an object illuminated by the light diffused by the optical element 16. The memory stores instructions to repeat the method 900. Accordingly, the integrity of the optical element 16 may be tested before each powering of the second light emitter 24.

Throughout this disclosure, use of "in response to" and "upon determining" indicates a causal relationship, not merely a temporal relationship. The numerical adjectives such as "first," "second," etc. are used herein as identifiers and do not indicate order, importance, or relative arrangement. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   an optical element having a light-shaping region, the light-shaping region having a light-shaping surface;
   a light emitter aimed into the optical element along an internal reflective path, the internal reflective path extending across the light-shaping region;
   a photodetector positioned along the internal reflective path; and
   a diffractive element along the internal reflective path between the light emitter and the photodetector;
   wherein the optical element has a front side, and the light-shaping surface, the diffractive element, the light emitter, and the photodetector are on the front side.

2. The assembly as set forth in claim 1, wherein the optical element has a back side and the diffractive element is designed to internally reflect light from the light emitter to the back side such that the back side internally reflects the light toward the photodetector by total internal reflection.

3. The assembly as set forth in claim 2, further comprising an input-light coupling and an output-light coupling on the back side, the input-light coupling being along the internal reflective path between the light emitter and the diffractive element, and the output-light coupling being along the internal reflective path between the diffractive element and the photodetector.

4. The assembly as set forth in claim 1, further comprising a second light emitter aimed externally at the light-shaping surface.

5. The assembly as set forth in claim 4, further comprising a computer having a processor and memory storing instructions executable by the processor to disable the second light emitter based on a detection by the photodetector indicating that the optical element is damaged.

6. The assembly as set forth in claim 5, wherein the memory stores instructions executable by the processor to determine that the optical element is damaged based on an amount of light detected by the photodetector from the light emitter.

7. The assembly as set forth in claim 5, wherein the memory stores instructions executable by the processor to power the second light emitter based on a detection by the photodetector indicating that the optical element is undamaged.

8. The assembly as set forth in claim 1, further comprising a casing, an exit window through the casing, and a second light emitter, wherein the optical element is positioned to direct light from the second light emitter toward the exit window and the optical element is designed to diffuse the light from the second light emitter.

9. The assembly as set forth in claim 8, wherein the optical element is designed to transmit light from the second light emitter.

10. The assembly as set forth in claim 1, further comprising a second light emitter aimed at the light-shaping surface and a computer in communication with the photodetector and the second light emitter, the computer programmed to power or disable the second light emitter based on detection by the photodetector.

11. The assembly as set forth in claim 1, wherein the photodetector is supported on the optical element.

12. The assembly as set forth in claim 1, wherein:
the optical element has a first region, a second region, and the light-shaping region is between the first region and the second region;
the photodetector is supported on the first region; and
the light emitter is supported on the second region and aimed at the photodetector across the light-shaping region.

13. An assembly comprising:
an optical element having a first region, a second region, and a light-shaping region between the first region and the second region, the light-shaping region having a light-shaping surface;
a photodetector supported on the first region; and
a light emitter supported on the second region and aimed at the photodetector across the light-shaping region;
wherein the optical element has a front side along the first region, the second region and the light-shaping region; and the light-shaping surface, the light emitter, and the photodetector are on the front side.

14. The assembly as set forth in claim 13, further comprising a diffractive element on the front side and positioned to reflect light from the light emitter toward the photodetector.

15. The assembly as set forth in claim 14, wherein the optical element has a back side and the diffractive element is designed to internally reflect light from the light emitter to the back side such that the back side internally reflects the light toward the photodetector by total internal reflection.

16. The assembly as set forth in claim 13, further comprising a second light emitter aimed externally at the light-shaping surface.

17. The assembly as set forth in claim 13, further comprising a casing, an exit window through the casing, and a second light emitter, wherein the optical element is positioned to direct light from the second light emitter toward the exit window and the optical element is designed to diffuse the light from the second light emitter.

18. A method comprising:
emitting light into an internal reflective path of an optical element;
determining that the optical element is damaged based on measurement of light along the internal reflective path;
disabling a light emitter aimed at the optical element based on the determination that the optical element is damaged;
wherein determining that the optical element is damaged includes detection of light below a threshold level.

19. The method as set forth in claim 18, further comprising, before determining that the optical element is damaged, powering the light emitter aimed at the optical element to diffuse the light with the optical element.

20. The method as set forth in claim 18, further comprising detecting a range of an object illuminated by the light diffused by the optical element.

21. An assembly comprising:
an optical element having a light-shaping region, the light-shaping region having a light-shaping surface;
a first light emitter aimed into the optical element along an internal reflective path, the internal reflective path extending across the light-shaping region;
a photodetector positioned along the internal reflective path;
a casing;
an exit window through the casing; and
a second light emitter, wherein the optical element is positioned to direct light from the second light emitter toward the exit window and the optical element is designed to diffuse the light from the second light emitter.

\* \* \* \* \*